US011953061B2

(12) United States Patent
Cohen et al.

(10) Patent No.: US 11,953,061 B2
(45) Date of Patent: Apr. 9, 2024

(54) CLUTCH SYSTEM WITH PHASE CHANGING MATERIALS

(71) Applicant: The Johns Hopkins University, Baltimore, MD (US)

(72) Inventors: Alexander Cohen, Baltimore, MD (US); Farshid Alambeigi, Baltimore, MD (US); Mehran Armand, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 101 days.

(21) Appl. No.: 17/602,859

(22) PCT Filed: Apr. 13, 2020

(86) PCT No.: PCT/US2020/027907
§ 371 (c)(1),
(2) Date: Oct. 11, 2021

(87) PCT Pub. No.: WO2020/214520
PCT Pub. Date: Oct. 22, 2020

(65) Prior Publication Data
US 2022/0178406 A1  Jun. 9, 2022

Related U.S. Application Data

(60) Provisional application No. 62/833,720, filed on Apr. 14, 2019.

(51) Int. Cl.
*F16D 35/00* (2006.01)
*B25J 9/10* (2006.01)

(52) U.S. Cl.
CPC .............. *F16D 35/00* (2013.01); *B25J 9/104* (2013.01); *F16D 2300/04* (2021.01)

(58) Field of Classification Search
CPC ............ F16D 37/008; F16D 2037/005; F16D 2300/04
See application file for complete search history.

(56) References Cited

U.S. PATENT DOCUMENTS

| 3,193,068 A * | 7/1965 | Greve ....................... F16D 9/02 464/17 |
| 5,201,392 A * | 4/1993 | Kramer ..................... F16D 9/02 192/58.4 |

(Continued)

FOREIGN PATENT DOCUMENTS

| DE | 19717705 | 10/1998 | |
| DE | 19717705 A1 * | 10/1998 | ............ F16D 35/00 |

(Continued)

OTHER PUBLICATIONS

SU99456A1 translation (Year: 1953).*

(Continued)

*Primary Examiner* — Timothy Hannon
(74) *Attorney, Agent, or Firm* — Casimir Jones, S.C.; Brian F. Bradley (57) ABSTRACT

A clutch system is provided. The clutch system includes an outer unit having a surface defining an aperture in the outer unit; an inner unit disposed in the aperture, wherein a shape of the inner unit matches a shape of the aperture; a low melting point material disposed in the aperture between the inner unit and the surface of the outer unit; a heating element; a temperature sensor; and a processor in electronic communication with the heating element and the temperature sensor. The processor is configured to control the heating element thereby changing the low melting point material between a soft state and a rigid state.

9 Claims, 6 Drawing Sheets

(56) References Cited

U.S. PATENT DOCUMENTS

| | | | |
|---|---|---|---|
| 9,253,888 B2* | 2/2016 | Weidinger | H05K 3/30 |
| 2012/0107145 A1* | 5/2012 | Roby | G01P 3/487 |
| | | | 417/223 |
| 2014/0277739 A1* | 9/2014 | Kornbluh | F16D 28/00 |
| | | | 29/428 |
| 2016/0311108 A1* | 10/2016 | Alambeigi | B25J 18/06 |
| 2018/0029225 A1* | 2/2018 | Plante | B25J 19/068 |
| 2021/0187758 A1* | 6/2021 | Lee | B25J 17/00 |

FOREIGN PATENT DOCUMENTS

| | | | |
|---|---|---|---|
| RU | 2343534 | | 1/2009 |
| RU | 2540395 | | 2/2015 |
| SU | 99456 | A1 * | 11/1953 |
| SU | 99456 | | 12/1954 |
| SU | 457823 | | 1/1975 |
| SU | 582503 | A1 * | 11/1977 |
| SU | 935661 | | 6/1982 |
| SU | 1794207 | | 2/1993 |
| SU | 582503 | | 11/1997 |

OTHER PUBLICATIONS

SU582503A1 translation (Year: 1977).*
DE19717705A1 translation (Year: 1998).*
International Search Report and Written Opinion for PCT/US2020/027907, dated Apr. 14, 2019. 7 pages.

* cited by examiner

CLUTCH SYSTEM WITH PHASE CHANGING MATERIALS

CROSS-REFERENCE TO RELATED APPLICATIONS

This application claims priority to U.S. provisional patent application No. 62/833,720, filed Apr. 14, 2019, the entire disclosure of which is incorporated herein by reference.

FIELD OF THE DISCLOSURE

This disclosure relates to clutch systems.

BACKGROUND OF THE DISCLOSURE

Clutches can engage and disengage power transmission, such as between a driving member and a driven member. One shaft is typically attached to an engine or other power unit (the driving member) while the other shaft (the driven member) provides output power for work. Rotational or linear motion can be transferred using the clutch.

Existing clutch systems can pose a problem for certain applications. The clutch systems may require large amounts of power to operate, which limits battery life. The clutch systems also may be too large for certain applications. Therefore, what is needed is an improved clutch system.

BRIEF SUMMARY OF THE DISCLOSURE

A clutch system is provided in a first embodiment. The clutch system comprises an outer unit having a surface defining an aperture in the outer unit, an inner unit disposed in the aperture, a low melting point material disposed in the aperture between the inner unit and the surface of the outer unit, a heating element, a temperature sensor, and a processor in electronic communication with the heating element and the temperature sensor. A shape of the inner unit matches a shape of the aperture. For example, the inner unit may be a cylinder. The processor is configured to control the heating element thereby changing the low melting point material between a soft state and a rigid state.

The heating element can be disposed in the inner unit.

The low melting point material may be Field's metal, Wood's metal, a thermoplastic polymer, or a rheological gel. In an instance, the low melting point material is the thermoplastic polymer such as polycaprolactone.

The outer unit and the inner unit can each be part of a printed circuit board.

The low melting point material can have a melting temperature of 62° C. or less.

The heating element can include at least one wire.

The temperature sensor may be a thermistor.

In an instance, an actuator includes a plurality of the clutch systems that are linked together using joints. The actuator can further include a cable connected to each of the plurality of the clutch systems and a cable mechanism configured to apply tension to the cable. The actuator also can further include a second cable connected to each of the plurality of the clutch systems and a second cable mechanism configured to apply tension to the second cable. The second cable is connected to each of the plurality of the clutch systems perpendicular to the cable.

A method is provided in a second embodiment. The method comprises providing a clutch system. The clutch system includes an outer unit having a surface defining an aperture in the outer unit, an inner unit disposed in the aperture, a low melting point material disposed in the aperture between the inner unit and the surface of the outer unit, and a heating element. The heating element is activated by applying voltage to the heating element. The low melting point material is in a soft state during the activating. The outer unit is moved relative to the inner unit during the activating.

The method can further include reducing voltage application to the heating element, changing the low melting point material from the soft state to a rigid state, and increasing resistance to movement of the outer unit relative to the inner unit.

The low melting point material may be Field's metal, Wood's metal, a thermoplastic polymer, or a rheological gel. In an instance, the low melting point material is the thermoplastic polymer such as polycaprolactone.

The low melting point material can have a melting temperature of 62° C. or less.

A temperature of the low melting point material can be measured.

In an instance, a plurality of the clutch systems are linked together using joints. The method can further include moving one of the clutch systems relative to another of the clutch systems. Moving one of the clutch systems relative to another of the clutch systems can use at least one cable.

BRIEF DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments of the clutch system disclosed herein provide locking and unlocking through stiffness tuning of a low melting point (LMP) material as the LMP material changes between solid phase and liquid phase. Thus, the LMP material can be used as a temporary glue or welding. The clutch system may include concentric circular cylinders separated by an LMP material or other surfaces sliding or moving against each other. In the soft state of the LMP material, the clutch is "unlocked" allowing for relative movement of the surfaces. In the solid state of the LMP material, the clutch is "locked" which can prevent relative movement of the surfaces. By cooling and heating the LMP material, the phase of the LMP material changes.

The clutch system disclosed herein provides improved weight bearing capacity compared to the amount of LMP material used in the clutch. Less power may be used compared to previous clutch systems, which can extend battery life of a power source for the clutch system. Embodiments disclosed herein can be used in a variety of applications such as robotic hands, exoskeletons, underactuated robotic systems, passive robotic arms, or drones. For example, the clutch system can be used in an under actuated hyper-redundant robotic manipulator in which each joint of the robot has this clutch mechanism. In another example, the clutch system can be used in a prosthetic robotic hand. In yet another example, the clutch system can be used in a robotic arm for drone applications. Embodiments disclosed herein can provide safe manipulation for reaching and grasping soft or hard objects with complex shapes or for human-robot interaction. Thus, soft robotics, such as those used for defense applications, may benefit from the embodiments disclosed herein.

Figure 1:
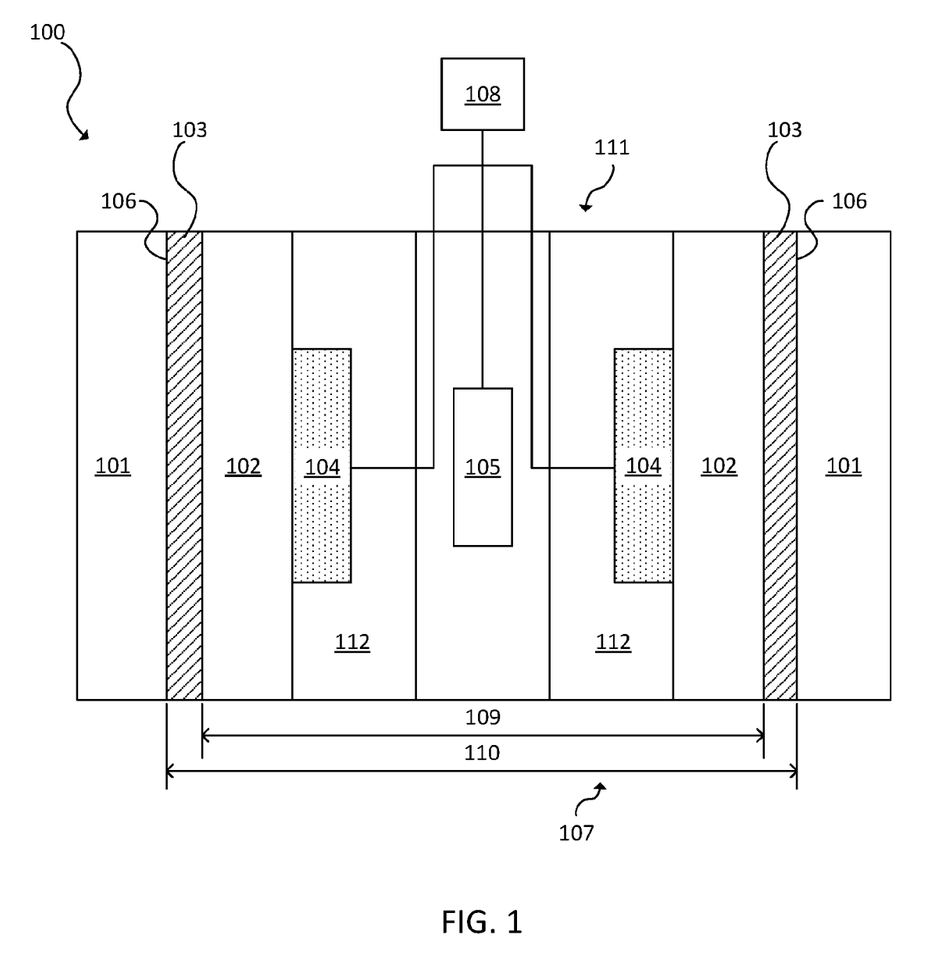
FIG. 1 is an axial cross-sectional diagram of an embodiment of a clutch system in accordance with the present disclosure.

FIG. 1 is an axial cross-sectional diagram of an embodiment of a clutch system 100. The clutch system 100 includes an outer unit 101 and an inner unit 102. The outer unit 101 and the inner unit 102 can be a metallic or nonmetallic material. The outer unit 101 has a surface 106 that defines an aperture 107 in the outer unit 101. In this instance, the aperture 107 extends through the center of the outer unit 101. Other designs of the aperture 107 are possible. Thus, the aperture 107 can have different shapes or may not extend fully through the outer unit 101.

The outer unit 101 and inner unit 102 can have dimensions on the millimeter scale. Larger dimensions are possible for certain applications. Power required for heating or cooling and the overall weight of the system may affect how large the outer unit 101 and inner unit 102 may be.

The inner unit 102 is disposed in the aperture 107 of the outer unit 101. The shape of the inner unit 102 may match the shape of the aperture 107. In an instance, both the inner unit 102 and the aperture 107 are cylindrical. This can enable movement or rotation of the inner unit 102 in the aperture 107. The inner unit 102 may have a diameter or length dimension (see the line 109) less than a diameter or length of the aperture 107 (see the line 110).

In an instance, the outer unit 101 and the inner unit 102 are each part of a PCB. PCBs can be used as structural and functional components to create a lightweight and strong system for the clutch system 100.

LMP material 103 is disposed in the aperture 107 between the inner unit 102 and the surface 106 of the outer unit 101. The LMP material 103 may be Field's metal, Rose's metal, Wood's metal, a thermoplastic polymer, rheological gel, or some other soft material. In an instance, the LMP material 103 is a thermoplastic polymer such as polycaprolactone. The thermoplastic polymer also may be an electro-activated polymer. Other materials, such as a Bi—Pb—In—Sn—Cd alloy, gallium, or a gallium alloy, can be used as the LMP material 103.

In an instance, the low melting point material 103 is the thermoplastic polymer such as polycaprolactone, polyethylene, polypropylene, polyvinyl chloride, polystyrene, polybenzimidazole, acrylic, nylon, or polytetrafluoroethylene. Combinations of these thermoplastic polymers also can be used. Thermoplastic polymers can be soft and flexible at certain temperatures and solidify upon cooling. Other thermoplastic materials besides those listed can be adapted to the embodiments disclosed herein.

In an instance, the low melting point material 103 may be a rheological gel such as a ferrofluid, a magnetorheological fluid, or an electrorheological fluid. An electrorheological fluid can include fine non-conducting particles (e.g., up to 50 micrometers in diameter) in an electrically insulating fluid. The apparent viscosity of these fluids can change reversibly by an order of up to 100,000 in response to an electrical field. A magnetorheological fluid is a suspension of micrometer-sized magnetic particles in a carrier fluid, which is usually a type of oil. When subjected to a magnetic field, the fluid greatly increases its viscosity, to the point of becoming a viscoelastic solid. The yield stress of the fluid when in its active (on) state can be controlled by varying the magnetic field intensity. For such rheological gels, electrical or magnetic fields can supplement or replace the changes in temperature disclosed herein.

The LMP material 103 can control the stiffness of a joint in the clutch system 100. The clutch system 100 may be part of a jointed system where each joint of the system has the clutch mechanism 100, and by unlocking or locking specific joints the jointed system can realize specific shapes. This "soft" or unlocked state of the clutch system 100 allows for relative motion at the joints of the jointed system. After the system is in its desired shape the clutch system 100 naturally goes to its desired locked state. This transition from a soft state to rigid state may occur in a short time since the melting point of these kinds of alloys (e.g. 62° C. for Field's metal) are relatively low. For example, the transition from a soft state to a rigid state may occur in as little as approximately two-thirds of a second. Other times for transition from a soft state to rigid state are possible. The amount of LMP material 103 can affect the transition time from a soft state to a rigid state.

Depending on the material and space between the inner unit 102 and outer unit 101, the amount of LMP material 103 may vary. The LMP material 103 may fill the slip fit tolerance between the inner unit 102 and outer unit 101 fully with a small amount of excess material on the outer edge of the gap. The LMP material 103 can act like a glue or welding material between two surfaces.

The material used for the LMP material 103 can depend on its environment and/or application. Field's metal can have an acceptable operating range for medical application and is biocompatible, but other factors can affect which material to use for the LMP material 103. A LMP material 103 with toxic components may not be acceptable for medical applications, but can still be used for industrial applications.

The LMP material 103 can have a melting point of 62° C. or less, 70° C. or less, or 98° C. or less.

The LMP material 103 may be non-toxic in some instances. This may be beneficial for medical applications.

The LMP material 103 can reduce or prevent rotational movement between the outer unit 101 and inner unit 102 and/or can reduce or prevent transitory movement between the outer unit 101 and inner unit 102. Rotational movement in the clutch system 100 can include movement of 360° or less. Transitory movement can include moving the inner unit 102 into or out of the outer unit 101.

Embodiments disclosed herein have been shown to withstand approximately 0.9 Nm of torque. The forces the clutch system 100 can handle can vary depending on size, materials, and application. In an instance, the clutch system 100 can carry loads up to 20 kg by using less than 0.5 g of Field's metal. However, other load limits are possible and this is only one example.

One or more heating elements 104 are disposed proximate the LMP material 103. The heating elements 104 may be disposed on or in the inner unit 102 or may be disposed on or in the outer unit 101. The heating element 104 of FIG. 1 may be adjacent to an inner surface of the inner unit 102.

In an instance, the heating element 104 includes a wire, such as a constantan wire. Other heating or cooling methods to change the phase of the LMP material are possible. Heating techniques such as one or more of Joule heating, resistive wires, induction heating, convection heat transfer, Kapton heaters, and flowing hot fluids inside the device can be used. Cooling techniques such as one or more of Peltier coolers, natural cooling, or flowing a cold liquid or gas can be used.

LMP materials can be used as variable stiffness joints in an articulating arm. By changing the phase and, therefore, stiffness, the arm becomes soft and movable. The stiffness of the joint can vary with temperature ranges of the LMP materials.

A temperature sensor 105 is used to measure temperature proximate the LMP material 103. The temperature sensor may be disposed on or in the inner unit 102 or may be disposed on or in the outer unit 101. In an instance, the temperature sensor 105 is a thermistor.

A processor 108 is in electronic communication with the heating element 104 and the temperature sensor 105. The processor 108 is configured to control the heating element 104 and can send instructions to adjust voltage. This can change the LMP material between a soft state and a rigid state.

The processor 108 may be part of various systems, including a personal computer system, mainframe computer system, workstation, network appliance, internet appliance, or other device. The processor 108 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 108 to implement various methods and functions may be stored in readable storage media.

Various steps, functions, and/or operations of clutch system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 108 or, alternatively, multiple processors 108.

The clutch system 100 may further include a voltage source (not illustrated) in electronic communication with the processor 108 and the heating element 104.

The clutch system 100 may further include an insulator 112. The insulator 112 may be disposed inside an aperture 111 of the inner unit 102. For example, the insulator may be press fit inside the aperture 111 of the inner unit 102. The heating element 104 may be disposed on, or embedded in, the insulator 112. For example, heating element 104 may be wrapped around an outer surface of the insulator 112. The insulator 112 may be a hollow tube. The temperature sensor 105 may be disposed in the hollow inside of the insulator 112. The insulator 112 may be composed of any suitable insulating material, such as ceramic.

Figure 2:
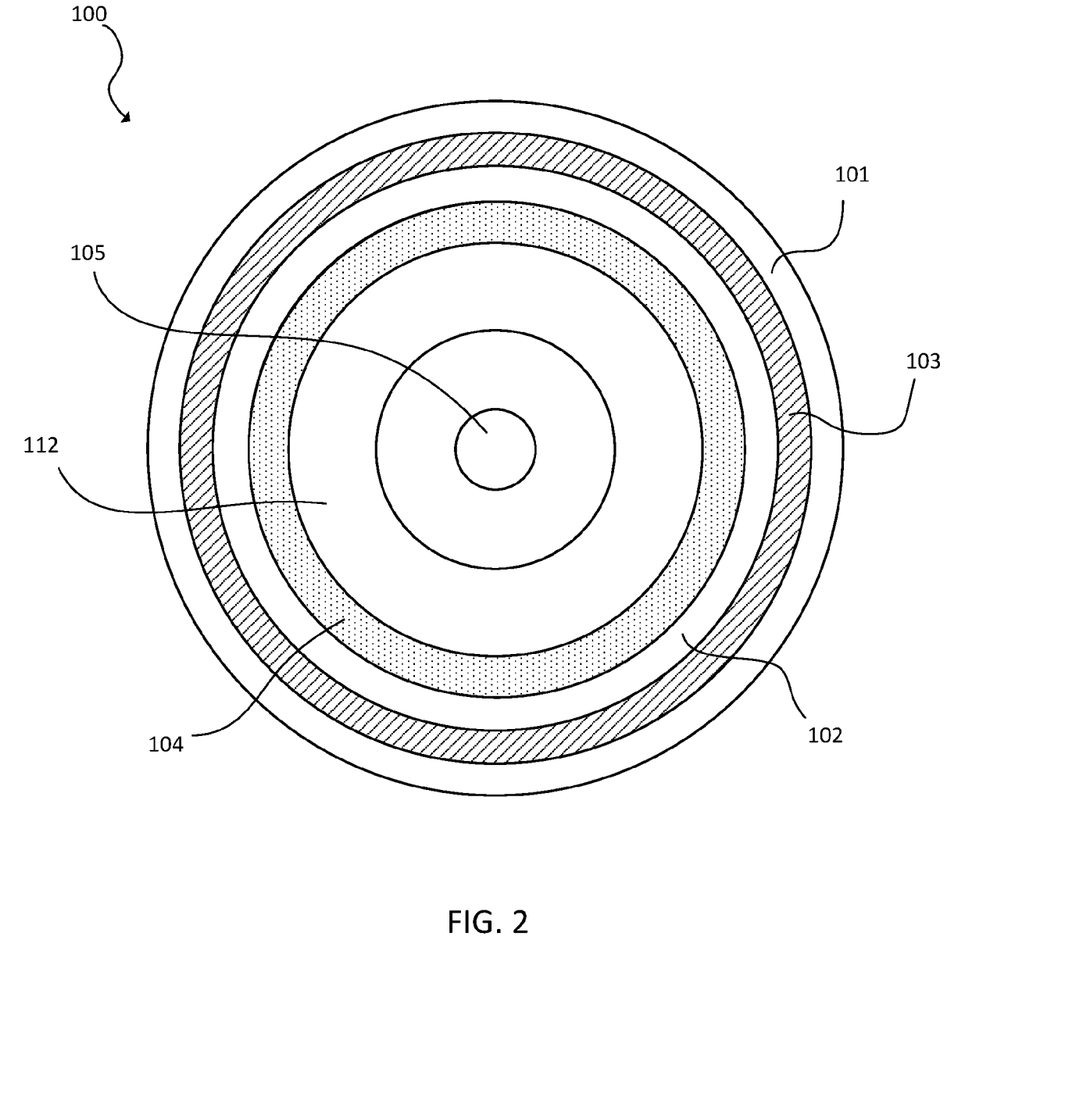
FIG. 2 is a lateral cross-sectional view of the clutch system of FIG. 1.

FIG. 2 is a lateral cross-sectional view of the clutch system of FIG. 1. In the embodiment of FIG. 2, two concentric brass tubes with a slip-fit tolerance are cut to size and polished. Then the two brass tubes form the outer unit 101 and inner unit 102, which are heated up with a flux applied to the surface. The surfaces of the brass tubes 101, 102 can be cleaned with a flux to allow for better adhesion and surface wetting of the material onto the material (e.g., brass). Then a small amount of LMP material 103 such as Field's metal (e.g., less than 0.1 gram) is placed near the interface of the brass tubes 101, 102. More flux may be applied to allow for better surface wetting. After the Field's metal reaches its melting temperature it wets the brass surface and then through capillary action the Field's metal flows through the gap between the brass tubes 101, 102 to create a temporary solder connection. Inside the inner brass tube 102 there is a heating element 104 and a way to monitor the temperature of the clutch system, such as a temperature sensor 105, which can be used to control the two states of the LMP material 103.

Embodiments of the clutch system disclosed herein may be used within a jointed system to configure to a desired shape when is soft. Once an arbitrary shaped object is gripped, the LMP material solidifies and applies gripping force to the object. This transition from a soft state to rigid state can happen in a short period of time because the melting point of LMP materials are typically low. For example, the melting point for Field's metal is 62° C.

LMP materials such as Field's metal can be used to change the stiffness of a clutch system used in catheters, endoscopes, or laparoscopic tools. Unlike memory shape alloys, temperature sensitive polymers, or electro active polymers (EAPs), the LMP material provides high stiffness during solid phase and has the capability to bear higher external loads.

Embodiments disclosed herein can provide the ability to partially or completely tune the stiffness of the clutch system. The stiffness can be tuned to suit a particular application or desired motion. For example, the current can be altered to different parts of the clutch system to provide stiffness tuning. The stiffness can refer to the soft state and the rigid state. The LMP material also can be kept in its transitional state.

Figure 3:
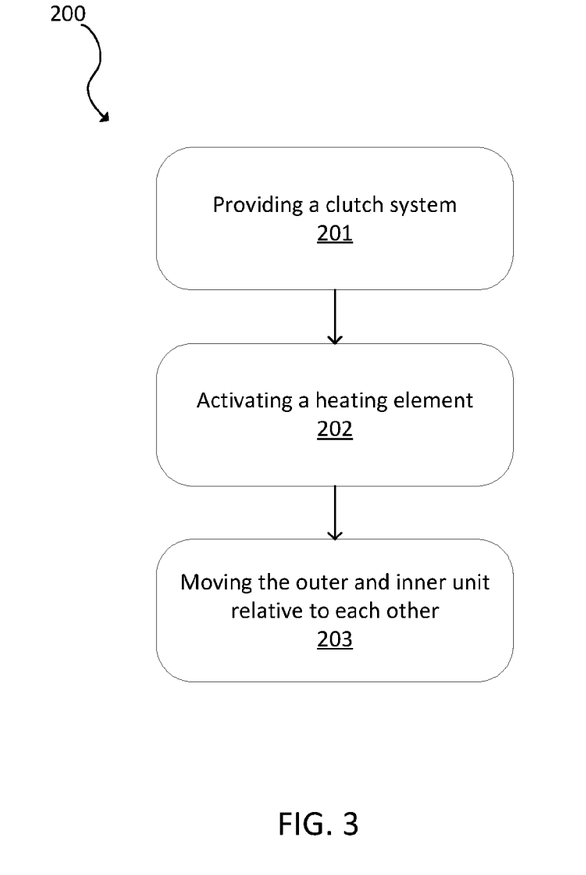
FIG. 3 is a flowchart of a method in accordance with the present disclosure.

FIG. 3 is a flowchart of a method 200. A clutch system is provided at step 201. The clutch system can have an outer unit having a surface defining an aperture in the outer unit, an inner unit disposed in the aperture, an LMP material disposed in the aperture between the inner unit and the surface of the outer unit, and a heating element. The clutch system may be an embodiment of the clutch systems illustrated in FIG. 1 or FIG. 2. The LMP material 103 may be Field's metal, Rose's metal, Wood's metal, a thermoplastic polymer, or a rheological gel. In an instance, the LMP material 103 is the thermoplastic polymer such as polycaprolactone. The LMP material 103 may have a melting temperature of 62° C. or less.

At step 202, a heating element is activated by applying voltage to the heating element. By applying voltage to the heating element, the temperature of the heating element may rise, thereby increasing the temperature of the other elements of the clutch system, for example, the inner unit, the LMP material, and/or the outer unit. The LMP material is in a soft state during the activating.

At step 203, the outer unit is moved relative to the inner unit during the activating.

Voltage to the heating element is reduced or even stopped. This reduces the temperature of the heating element, and the temperature of the clutch system decreases, such as toward ambient temperature. This changes the LMP material from the soft state to a rigid state. When the LMP material is in a rigid state, resistance to movement of the outer unit relative to the inner unit is increased. In an instance, movement can be initiated and voltage can be stopped after the LMP material is liquid, but if an extended period of movement is required the voltage can be continuously applied during movement.

In an instance, the temperature of or otherwise around the LMP material may be measured.

Figure 4:
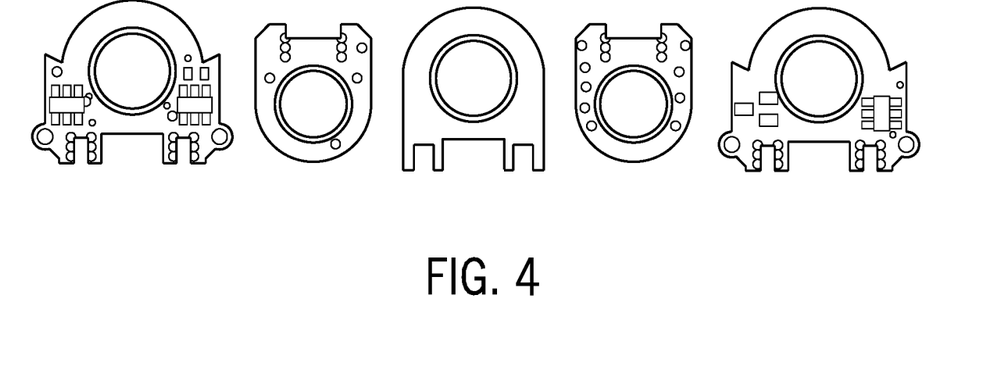
FIG. 4 are exemplary printed circuit boards (PCBs) to control and house the clutch system.
Figure 5:
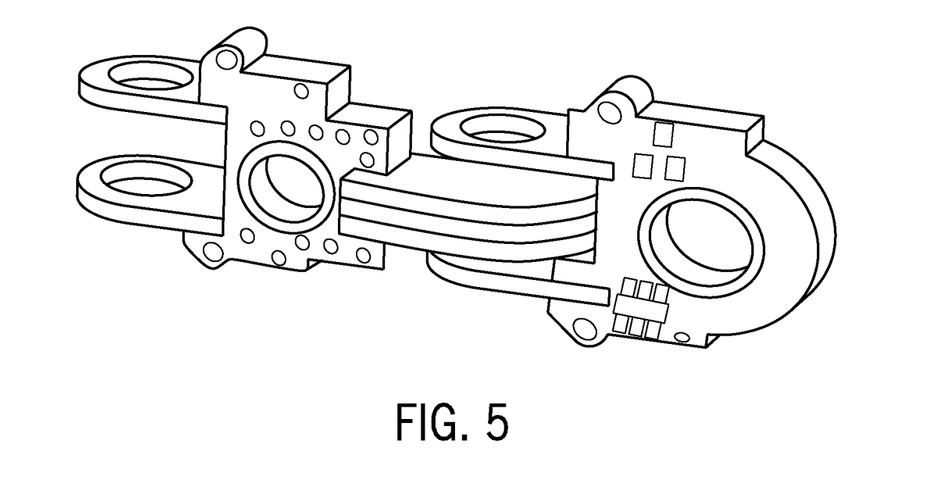
FIG. 5 is an exemplary clutch system made from PCBs.

In another embodiment, the clutch system can be constructed using PCBs, which function as both mechanical and electrical components and can constitute a robot's body with the clutch system as the connecting joints. This can make the overall structure simpler and compact while providing enough stability and strength for the structure. FIG. 4 are exemplary PCBs to control and house the clutch system. FIG. 5 is an exemplary clutch system made from PCBs.

Figure 6:
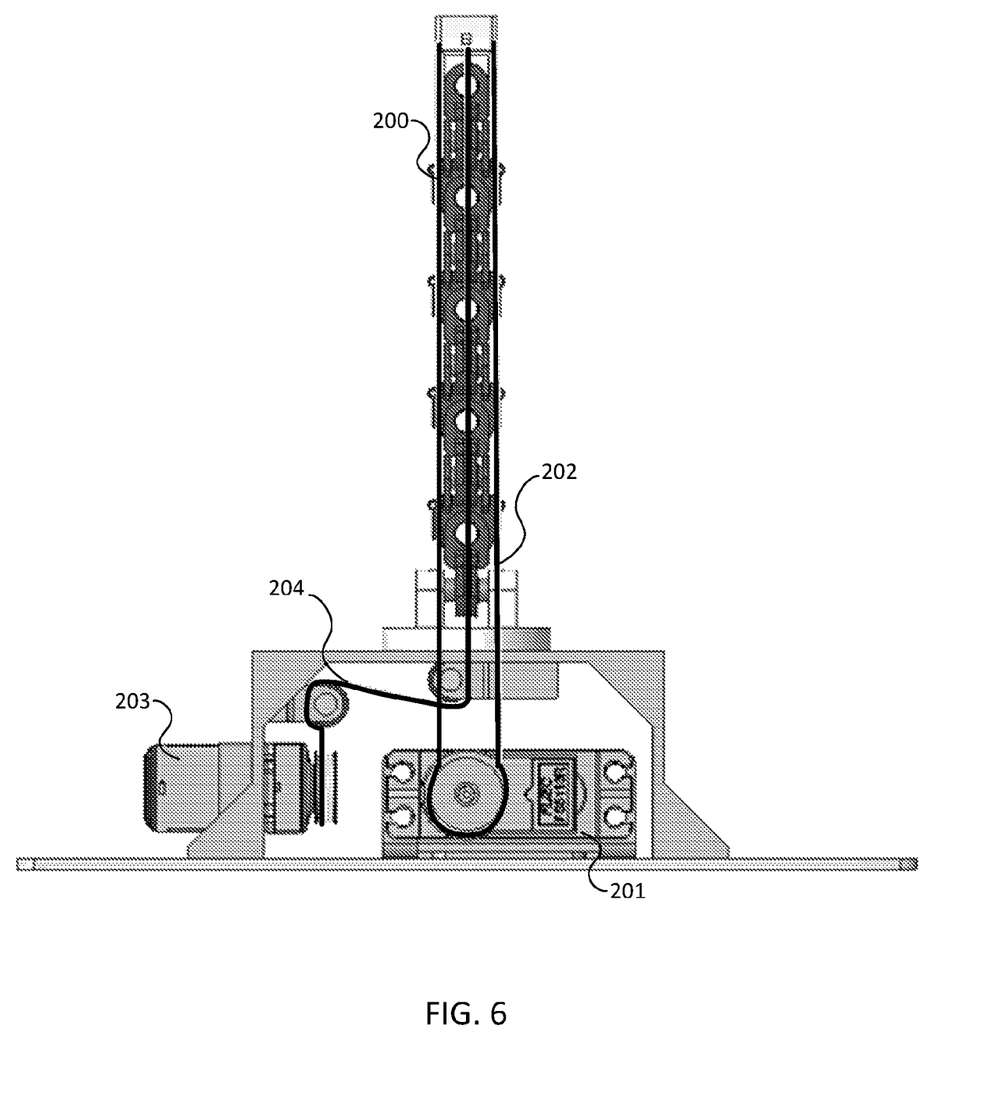
FIG. 6 is a diagram of a PCB design implemented in an actuator.
Figure 7:
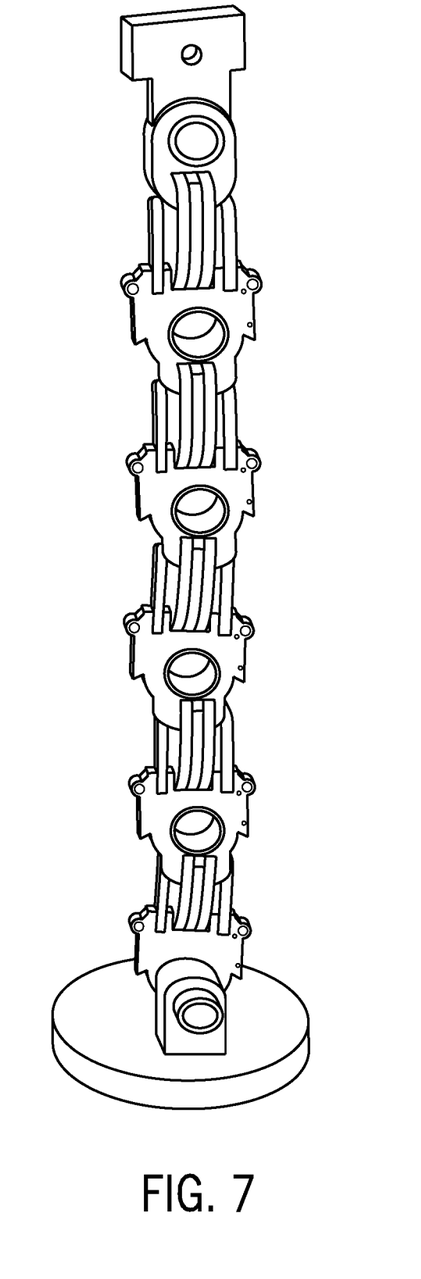
FIG. 7 is an exemplary actuator made from PCBs.

FIG. 6 is a diagram of a PCB design implemented in an actuator. FIG. 7 is an exemplary actuator made from PCBs. The actuator includes a plurality of the clutch systems 200 linked together using joints. A cable 202 can connect each of the clutch systems 200. A cable mechanism 201 can be configured to apply tension to the cable 202. An optional second cable 204 can also be connected to each of the clutch systems 200. The second cable 204 is connected to each of the plurality of the clutch systems 200 perpendicular to the cable 202. A second cable mechanism 203 can be configured to apply tension to the second cable 204. The cable mechanism 201 and the second cable mechanism 203 can be include a spool to wind the cable 202 or second cable 204.

The clutch systems 200 can include a unit, such as the embodiment of FIG. 1, soldered to the PCB. The LMP material may be added to the unit prior to soldering the unit into the clutch systems 200.

The cable 202 and second cable 204 may be steel coating in nylon, but other materials are possible. The cable 202 and second cable 204 may be preloaded so there is little to no slack, which can provide higher precision control.

The clutch systems can move relative to each other using the cable and/or the second cable. The clutch systems also can be held in a position relative to each other using the cable and/or the second cable. Thus, the cable-driven actuator can provide active control of the actuator's shape.

Each of the steps of the method may be performed as described herein. The methods also may include any other step(s) that can be performed by the processor described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. An actuator comprising:
  a plurality of the clutch systems that are linked together using joints;
  wherein each of the plurality of clutch systems includes:
    an outer unit having a surface defining an aperture in the outer unit;
    an inner unit disposed in the aperture and concentric with the outer unit, wherein a shape of the inner unit matches a shape of the aperture;
    a low melting point material disposed in the aperture between the inner unit and the surface of the outer unit;
    a heating element;
    a temperature sensor; and
    a processor in electronic communication with the heating element and the temperature sensor, wherein the processor is configured to control the heating element thereby changing the low melting point material between a soft state and a rigid state; and
  wherein the actuator further includes:
    a first cable connected to each of the plurality of the clutch systems;
    a first cable mechanism configured to apply tension to the first cable;
    a second cable connected to each of the plurality of the clutch systems; and
    a second cable mechanism configured to apply tension to the second cable.

2. The actuator of claim 1, wherein the inner unit is a cylinder.

3. The actuator of claim 1, wherein the heating element is disposed in the inner unit.

4. The actuator of claim 1, wherein the low melting point material is Field's metal, Rose's metal, Wood's metal, a thermoplastic polymer, or a rheological gel.

5. The actuator of claim 4, wherein the low melting point material is the thermoplastic polymer, and wherein the thermoplastic polymer is polycaprolactone.

6. The actuator of claim 1, wherein the outer unit and the inner unit are each part of a printed circuit board.

7. The actuator of claim 1, wherein the low melting point material has a melting temperature of 62° C. or less.

8. The actuator of claim 1, wherein the heating element includes at least one wire.

9. The actuator of claim 1, wherein the temperature sensor is a thermistor.

* * * * *